United States Patent
Thanuvan et al.

(10) Patent No.: US 10,181,143 B2
(45) Date of Patent: Jan. 15, 2019

(54) PROVIDING PRIVILEGES AND GRANTING OR DENYING A LEVEL OF ACCESS TO RESOURCES BASED ON AUTHENTICATION BY AUTHENTICATION SOURCES

(71) Applicant: eBay Inc., San Jose, CA (US)

(72) Inventors: Venkatesh Thanuvan, Tamilnadu (IN); Badrinath Vengalathur Srinath, Chennai TamilNadu (IN)

(73) Assignee: eBay Inc., San Jose, CA (US)

(*) Notice: Subject to any disclaimer, the term of this patent is extended or adjusted under 35 U.S.C. 154(b) by 860 days.

(21) Appl. No.: 14/462,361

(22) Filed: Aug. 18, 2014

(65) Prior Publication Data
US 2016/0048893 A1   Feb. 18, 2016

(51) Int. Cl.
*H04L 9/32* (2006.01)
*G06Q 30/06* (2012.01)
*H04L 29/06* (2006.01)

(52) U.S. Cl.
CPC ......... *G06Q 30/0609* (2013.01); *H04L 63/08* (2013.01); *H04L 2463/102* (2013.01)

(58) Field of Classification Search
CPC  G06Q 30/0601–30/0633; G06Q 30/08; H04L 63/08; H04L 2463/102
USPC .................... 705/26.1–27.2, 26.35
See application file for complete search history.

(56) References Cited

U.S. PATENT DOCUMENTS

| | | | | |
|---|---|---|---|---|
| 8,925,053 B1* | 12/2014 | Mehta | ..................... | G06F 21/31 713/155 |
| 2007/0101418 A1* | 5/2007 | Wood | ..................... | G06F 21/31 726/8 |
| 2015/0142647 A1* | 5/2015 | Johnson | ............... | G06Q 20/108 705/40 |
| 2015/0227732 A1* | 8/2015 | Doctor | .................... | G06F 21/31 726/4 |
| 2015/0229624 A1* | 8/2015 | Grigg | ..................... | H04L 63/08 726/7 |

OTHER PUBLICATIONS

D. Chadwick, A. Otenko and E. Ball, "Role-based access control with X.509 attribute certificates," in IEEE Internet Computing, vol. 7, No. 2, pp. 62-69, Mar.-Apr. 2003. doi: 10.1109/MIC.2003.1189190; (Year: 2003).*

* cited by examiner

*Primary Examiner* — Resha Desai
*Assistant Examiner* — Michelle T Kringen
(74) *Attorney, Agent, or Firm* — Schwegman Lundberg & Woessner, P.A.

(57) ABSTRACT

A system and method for a service level application are described. The service level application receives authentication data from a client seeking access to establish an account in an online marketplace. The service level application identifies a source of truth corresponding to the authentication data and verifies the authentication data with the corresponding source of truth. The service level application determines an access level tier to the online marketplace for the client based on the source of truth.

17 Claims, 10 Drawing Sheets

PROVIDING PRIVILEGES AND GRANTING OR DENYING A LEVEL OF ACCESS TO RESOURCES BASED ON AUTHENTICATION BY AUTHENTICATION SOURCES

TECHNICAL FIELD

This application relates generally to the field of computer technology, and in a specific example embodiment, enabling access to service levels based on source of truth.

BACKGROUND

To reduce fraudulent activities, procedures to verify and approve prospective sellers signing up for an e-commerce account can be lengthy and time consuming. Some authentication methods include generating a challenge-response test to protect websites against bots by grading tests that humans can pass but current computer programs cannot. Other risk-reduction methods include obtaining a bank account number, a credit card number, a social security number, or any other unique identifying data to verify an identity of a prospective seller. Once the identifying data is verified, a seller has unfettered access to the e-commerce website.

BRIEF DESCRIPTION OF THE DRAWINGS

The present disclosure is illustrated by way of example, and not by way of limitation, in the figures of the accompanying drawings, in which.

DETAILED DESCRIPTION

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A system and method for providing a service level application are described. The service level application receives authentication data from a client seeking access to establish an account in an online marketplace. The service level application identifies a source of truth corresponding to the authentication data and verifies the authentication data with the corresponding source of truth. The source of truth may identify an authentication authority or agency (e.g., Department of Motor Vehicles, Social Security Agency, credit bureau, bank, network security provider, cryptosystem, peer referrals, email provider). The service level application determines an access level tier to the online marketplace for the client based on the source of truth. The access level tier identifies a scope of access to the online marketplace. For example, an access level tier may identify a maximum sale amount for an item to be listed and a maximum number of transactions in a given time period. The service level application may then provide the client with the access level tier to the online marketplace in response to validated or verified authentication data.

In one example embodiment, the service level application receives an authentication type corresponding to the authentication data. The authentication type is determined based on the authentication data.

In another example embodiment, the service level application identifies the source of truth in response to at least one of an authentication type of the authentication data, and the authentication data. The service level application accesses the source of truth, and validates the authentication data based on the access to the source of truth.

In another example embodiment, the service level application generates an access level tier matrix for the online marketplace and determines the access level tier from the access level tier matrix for the client based on the corresponding source of truth.

In another example embodiment, the service level application generates an access level tier matrix for the online marketplace and determines the access level tier from the access level tier matrix for the client based on an authentication type corresponding to the authentication data.

In another example embodiment, the service level application generates an authentication challenge to the client and receives a response to the authentication challenge from the client. The service level application may then identify a verification program associated with the authentication challenge. For example, if the authentication challenge includes a Captcha challenge or an audio visual challenge to filter out bots, the verification program may include the program that validates and verifies that the response from the client is correct. The verification program may be used to validate the response to the authentication challenge from the client. The service level application then determines the access level tier to the online marketplace based on the verification program.

In another example embodiment, the service level application communicates the access level tier of the client to the online marketplace. The online marketplace limits transaction activities of the client based on the access level tier assigned to the client.

System Architecture

Figure 1:
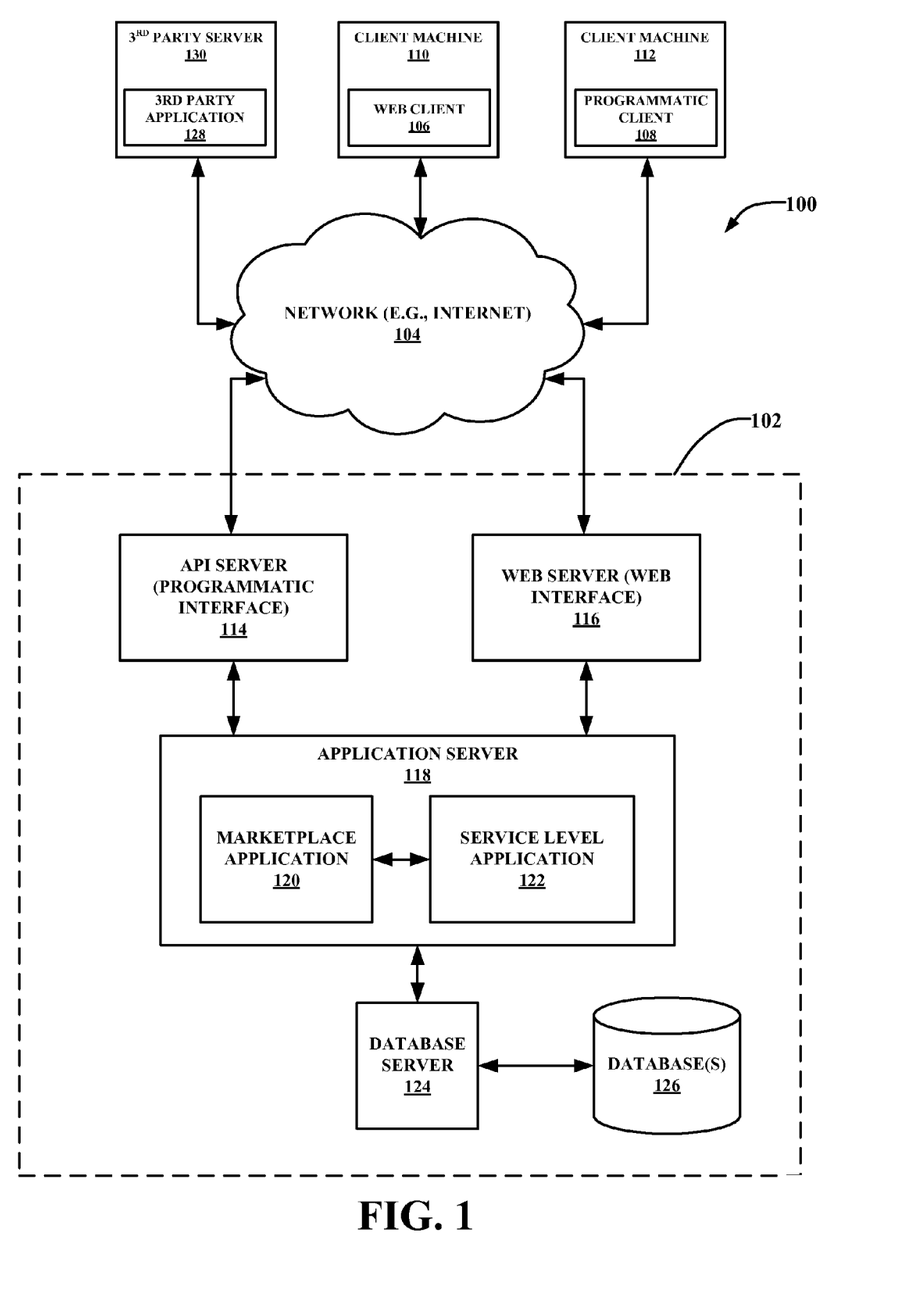
FIG. 1 is a network diagram depicting a network system having a client-server architecture configured for exchanging data over a network, according to one embodiment.

FIG. 1 is a network diagram depicting a network system 100 having a client-server architecture configured for exchanging data over a network, according to one embodiment. For example, the network system 100 may be a publication/publisher system where clients may communicate and exchange data within the network system 100. The data may pertain to various functions (e.g., online item purchases) and aspects (e.g., managing content and user reputation values) associated with the network system 100 and its users. Although illustrated herein as a client-server architecture, other embodiments may include other network architectures, such as peer-to-peer or distributed network environments.

A data exchange platform, in an example form of a marketplace application 120 and a service level application 122, may provide server-side functionality via a network 104 (e.g., the Internet) to one or more clients. The one or more clients may include users that utilize the network system 100 and, more specifically, the marketplace application 120 and the service level application 122, to exchange data over the network 104. These transactions may include transmitting, receiving (communicating), and processing data to, from, and regarding content and users of the network system 100. The data may include, but is not limited to, content and user data such as user profiles; user attributes; product and service reviews and information, such as pricing and descriptive information; product, service, manufacturer, and vendor recommendations and identifiers; product and service listings associated with buyers and sellers; auction bids; and transaction data, such as collection and payment, shipping transactions, shipping label purchases, and real time synchronization of financial journals, among others.

In various embodiments, the data exchanges within the network environment 100 may be dependent upon user-selected functions available through one or more client or user interfaces (UIs). The UIs may be associated with a client machine, such as a client machine 110 using a web client 106. The web client 106 may be in communication with the marketplace application 120 via a web server 116. The UIs may also be associated with a client machine 112 using a programmatic client 108, such as a client application, or a third party server 130 using a third party application 128. It can be appreciated that in various embodiments, the client machines 110 or 112, or the third party server 130, may be associated with a buyer, a seller, a third party electronic commerce platform, a payment service provider, a shipping service provider, or a financial institution system, each in communication with the networked system 102 and optionally with each other. The buyers and sellers may be any one of individuals, merchants, or service providers.

Turning specifically to the marketplace application 120 and the service level application 122, an application program interface (API) server 114 and the web server 116 are coupled to, and provide programmatic and web interfaces respectively to, one or more application servers 118. The application server 118 hosts a marketplace application 120 and the service level application 122. The application server 118 is, in turn, shown to be coupled to one or more database servers 124 that facilitate access to one or more databases 126.

In one embodiment, the web server 116 and the API server 114 communicate and receive data pertaining to listings and transactions, among other things, via various user input tools. For example, the web server 116 may send and receive data to and from a toolbar or webpage on a browser application (e.g., the web client 106) operating on a client machine (e.g., the client machine 110). The API server 114 may send and receive data to and from an application (e.g., the programmatic client 108 or the third party application 128) running on another client machine (e.g., the client machine 112 or the third party server 130).

In one embodiment, the marketplace application 120 provides listings and price-setting mechanisms whereby a user may be a seller or buyer who lists or buys goods or services (e.g., for sale) published on the marketplace application 120.

In one embodiment, the service level application 122 provides a system and a method for generating service level tiers, and assigning a service level tier based on authentication data or an authentication data type provided by a client. The service level application 122 may set a maximum listing price or a maximum number of transactions for a seller in the marketplace application 120 based on the type of authentication data provided by the seller when the seller signs up for an account with the marketplace application 120. The type of authentication data may be used to verify the identity of the seller. For example, the service level tier for a seller providing a driver's license number from a Department of Motor Vehicles agency may be higher than the service level tier for a seller providing an email address as authentication data. In another example, different source of truth agencies may correspond to different service level tiers. For example, a passport agency as a source of truth may correspond to a higher service level tier than would a local library as a source of truth. In another example, the type of authentication data may correspond to an authentication program that generates a challenge (e.g., Captcha, video feedback) to the client to prevent bots from impersonating users. Components of the service level application 122 are described in more detail below with respect to FIG. 3.

Figure 2:
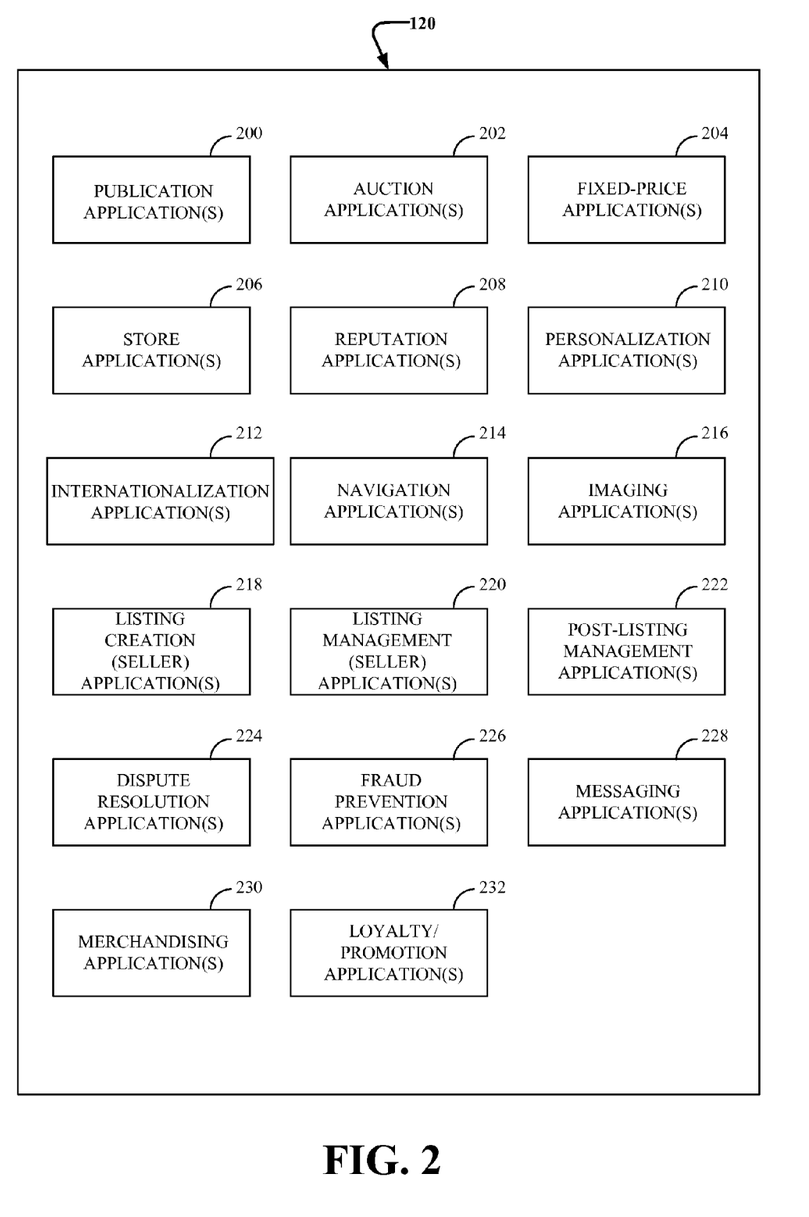
FIG. 2 shows a block diagram illustrating one example embodiment of a marketplace application.

FIG. 2 shows a block diagram illustrating one example embodiment of the marketplace application 120. The marketplace application 120 may be hosted on dedicated or shared server machines (not shown) that are communicatively coupled to enable communications between server machines. The marketplace application 120 and the service level application 122 themselves are communicatively coupled (e.g., via appropriate interfaces) to each other and to various data sources, so as to allow information to be passed between the marketplace application 120 and the service level application 122 or so as to allow the marketplace application 120 and the service level application 122 to share and access common data. The marketplace application 120 and the service level application 122 may, furthermore, access the one or more databases 126 via the database servers 124.

The networked system 102 may provide a number of publishing, listing, and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace application 120 is shown to include at least one publication application 200 and one or more auction applications 202, which support auction-format listing and price setting mechanisms (e.g., English, Dutch, Vickrey, Chinese, Double, Reverse auctions,). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., a traditional classified-advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. For example, consider that where the networked system 102 supports person-to-person trading, users may have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page in which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information in (or the presentation of information by) the networked system 102 according to predetermined criteria (e.g., geographic, demographic, or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browse applications.

In order to make listings available via the networked system 102 as visually informing and attractive as possible, the marketplace application 120 may include one or more imaging applications 216, which users may utilize to upload images for inclusion within the listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored or published a large number of listings, the management of such listings may present a challenge. The listing management applications 220 provide a number of features (e.g., auto-relisting, inventory level monitors) to assist the seller in managing such listings. One or more post-listing management applications 222 also assist sellers with a number of activities that typically occur post-listing. For example, upon completion of an auction facilitated by the one or more auction applications 202, a seller may wish to leave feedback regarding a particular buyer. To this end, a post-listing management application 222 may provide an interface to the one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 228 may utilize any one of a number of message delivery networks and platforms to deliver messages to users. For example, the messaging applications 228 may deliver electronic mail (e-mail), instant message (IM), Short Message Service (SMS), text, facsimile, or voice (e.g., Voice over IP (VoIP)) messages via wired (e.g., the Internet), plain old telephone service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotion points for each transaction established or concluded with a particular seller, and be offered a reward for which accumulated loyalty points can be redeemed.

Service Level Application

Figure 3:
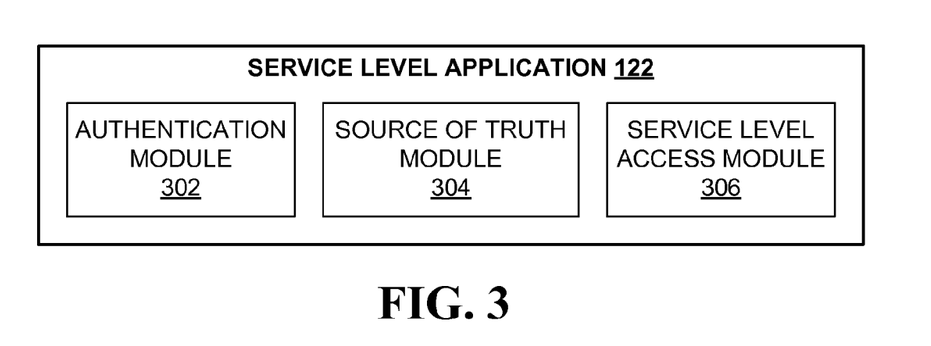
FIG. 3 shows a block diagram illustrating one example embodiment of a service level application.

FIG. 3 shows a block diagram illustrating one example embodiment of the service level application 122. The service level application 122 may include an authentication module 302, a source of truth module 304, and a service level access module 306.

The authentication module 302 may determine a type of authentication data received from the client. For example, the authentication module 302 may determine that the authentication data corresponds to a telephone number based on a format. In another example, the client may specify the type of authentication data (e.g., telephone number, address, driver's license number). In another embodiment, the authentication module 302 may determine an authentication program based on the authentication data. For example, the authentication program may include a Captcha challenge, a password, or any other challenge-response authentication program. The authentication module 302 is described in more detail below with respect to FIG. 4.

The source of truth module 304 may determine a source of truth corresponding to the authentication data. The source of truth may include an authority or an agency associated with the authentication data. For example, the source of truth for a driver's license number would be a Department of Motor Vehicles agency. The source of truth for a Social Security number would be the Social Security Administration agency. The source of truth for a credit card number may be a credit bureau or a bank. The source of truth module 304 is described in more detail below with respect to FIG. 5.

The service level access module 306 may generate a tiered access level matrix for the marketplace application 120 based on the type of the authentication data and a type of the source of truth. The service level access module 306 assigns an access level tier to a seller in the marketplace application 120. The service level access module 306 is described in more detail below with respect to FIG. 6.

Figure 4:
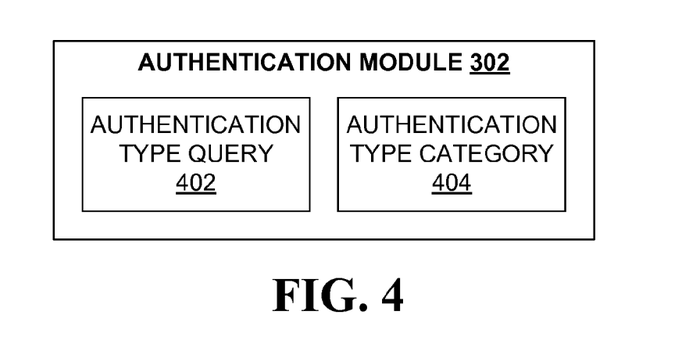
FIG. 4 shows a block diagram illustrating one example embodiment of an authentication module.

FIG. 4 shows a block diagram illustrating one example embodiment of the authentication module 302. The authentication module 302 may include an authentication type query module 402 and an authentication type category module 404. The authentication type query module 402 may generate a query to the client requesting the client to specify a type of authentication data. The authentication type category module 404 may determine the type of authentication data based on a format of the authentication data provided by the client or based on the information provided by the client in response to the query generated by the authentication type query module 402. As previously described, authentication types may include using authentication data related to a source of truth or using an authentication program such as a username and password. In another embodiment, the authentication type category module 404 generates a category for the information provided by the client in response to the query generated by the authentication type query module 402.

Figure 5:
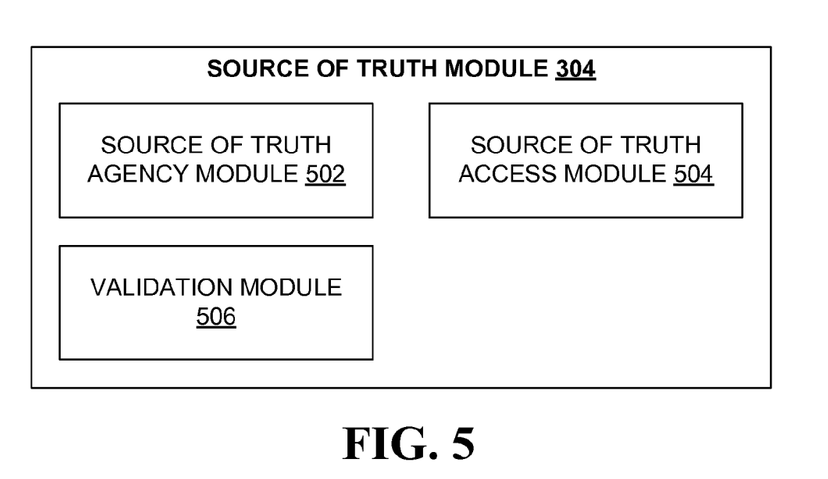
FIG. 5 shows a block diagram illustrating one example embodiment of a source of truth module.

FIG. 5 shows a block diagram illustrating one example embodiment of the source of truth module 304. The source of truth module 304 may include a source of truth agency module 502, a source of truth access module 504, and a validation module 506. The source of truth agency module 502 determines which agency to access based on the authentication data provided by the client. For example, the source of truth agency module 502 may determine that the source of truth is a bank corresponding to a bank account number provided by the client.

The source of truth access module 504 may be configured to access multiple source of truth agencies. For example, the source of truth access module 504 may access and query a database of the bank related to the bank account number provided by the client. In another example, the source of truth access module 504 may access and query information from a credit bureau in response to credit information provided by the client.

The validation module 506 may be configured to verify the information provided by the client with the corresponding source of truth agency. For example, the validation module 506 may query a bank to verify a validity of the bank account number provided by the client. If the bank account number is valid, the validation module 506 may validate the authentication data provided by the client.

Figure 6:
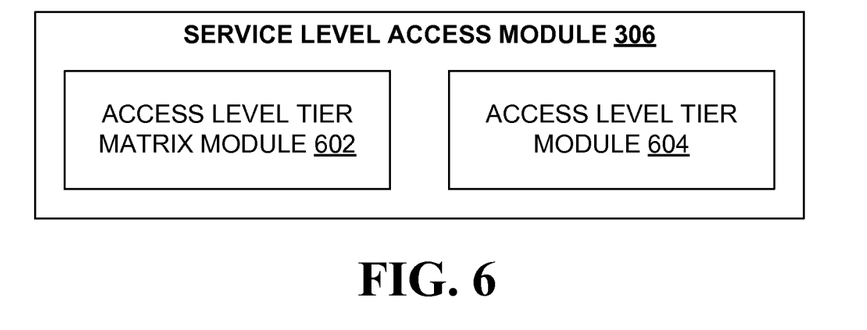
FIG. 6 shows a block diagram illustrating one example embodiment of a service level access module.

FIG. 6 shows a block diagram illustrating one example embodiment of the service level access module 306. The service level access module 306 may include an access level tier matrix module 602 and an access level tier module 604. The service level access module 306 determines a level of access tier based on the type of source of truth or authentication data. The access level tier matrix module 602 may generate a matrix identifying access level tiers based on the type of source of truth or authentication data. For example, the access level tier matrix may include a first access level tier corresponding to a source of truth such as credit bureau agencies, a second access level tier corresponding to banks, and a third access level tier corresponding to e-mail providers. The first access level tier may include greater access privileges than the second and third access level tiers. The second access level tier may include greater access privileges than the third access level tier. The privileges may include a sale amount limit and a limit on number of transactions during a predefined amount of time. The privileges may increase as the user transacts more frequently with the marketplace application 120 and receives positive feedback from buyers (e.g., through the reputation applications 208). The access level tier module 604 assigns an access level tier to the client based on the access level tier matrix.

Figure 7:
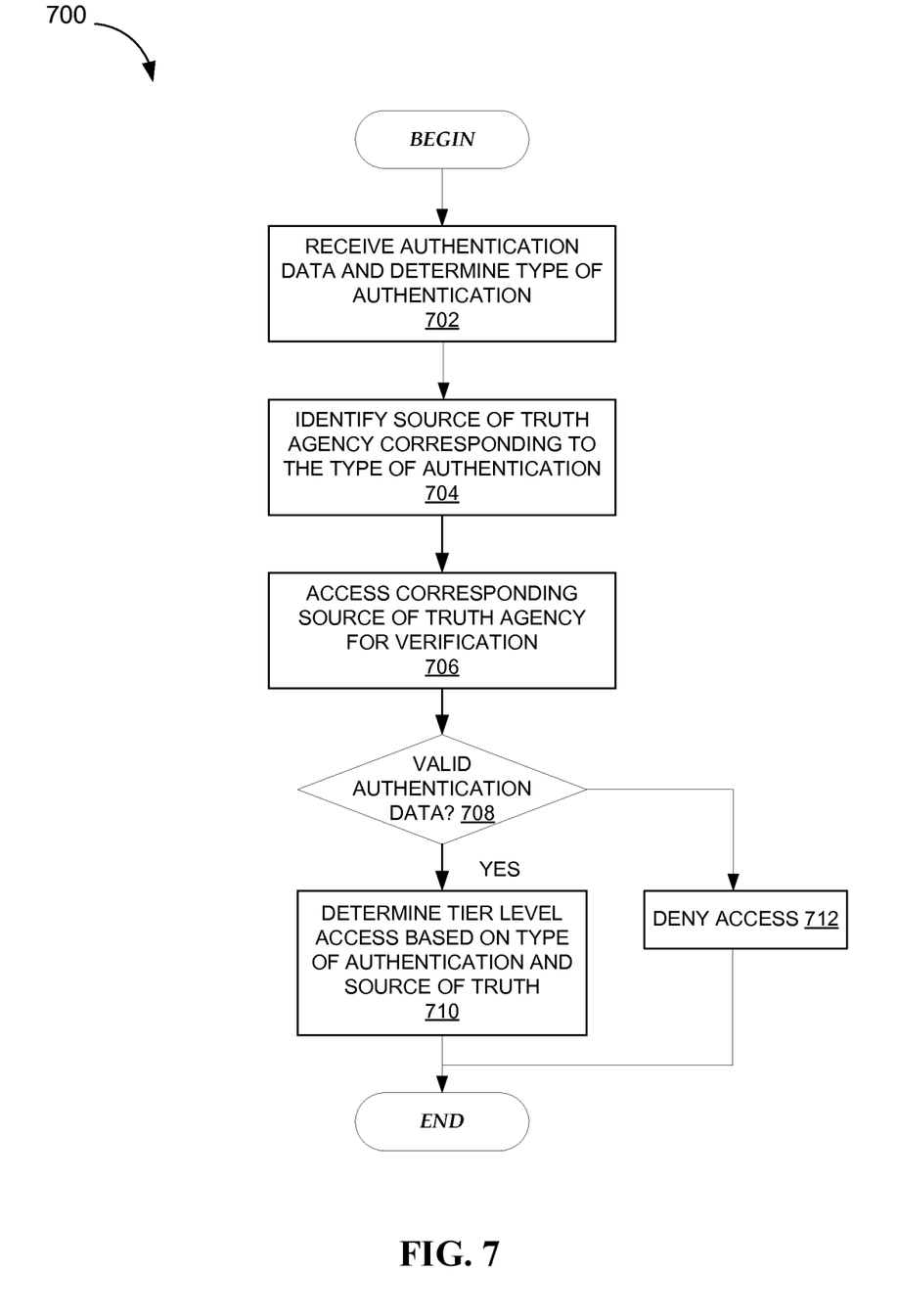
FIG. 7 shows a flow diagram illustrating one example embodiment of an operation of the service level application.

FIG. 7 shows a flow diagram illustrating one example embodiment of a method 700 of the service level application 122. At operation 702, the service level application 122 receives authentication data and determines a type of authentication corresponding to the authentication data. In one example embodiment, operation 702 may be implemented with the authentication module 302. At operation 704, the service level application 122 identifies a source of truth agency corresponding to the type of authentication. In one example embodiment, operation 704 may be implemented with the source of truth module 304. At operation 706, the service level application 122 accesses the corresponding source of truth agency to verify the authentication data provided by the client. In one example embodiment, operation 706 may be implemented with the source of truth module 304. At operation 708, the service level application 122 determines whether the provided authentication data is valid based on the access to the corresponding source of truth agency. In one example embodiment, operation 708 may be implemented with the source of truth module 304. The service level application 122 may deny the client access to opening an account with the marketplace application 120 in response to invalid authentication data at operation 712. For example, the service level application 122 may determine that the client is a bot based on the invalid authentication data. At operation 710, the service level application 122 determines and assigns an access level tier to the client or user based on the type of authentication and the source of truth. In one example embodiment, operation 710 may be implemented with the service level access module 306.

Figure 8:
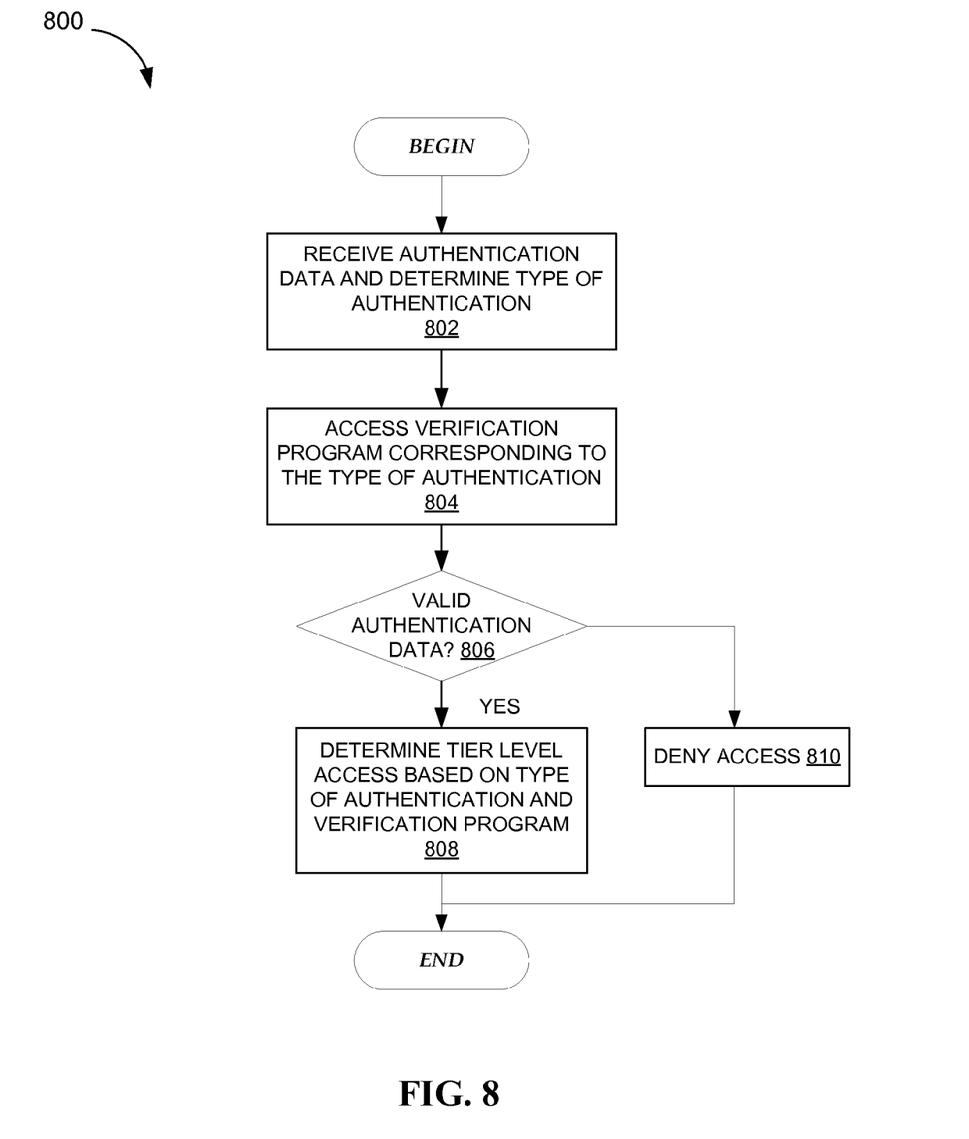
FIG. 8 shows a flow diagram illustrating another example embodiment of an operation of the service level application.

FIG. 8 shows a flow diagram illustrating another example embodiment of a method 800 of the service level application 122. At operation 802, the service level application 122 receives authentication data from a client and determines the type of authentication corresponding to the authentication data. In one example embodiment, operation 802 may be implemented with the authentication type query module 404. At operation 804, the service level application 122 accesses a verification program corresponding to the type of authentication. At operation 806, the service level application 122 determines whether the authentication data is valid using the verification program. The service level application 122 may deny the client access to opening an account with the marketplace application 120 in response to invalid authentication data at operation 810. At operation 808, the service level application 122 determines and assigns an access level tier to the client or user based on the type of authentication and the verification program. In one example embodiment, operation 808 may be implemented with the service level access module 306.

Figure 9:
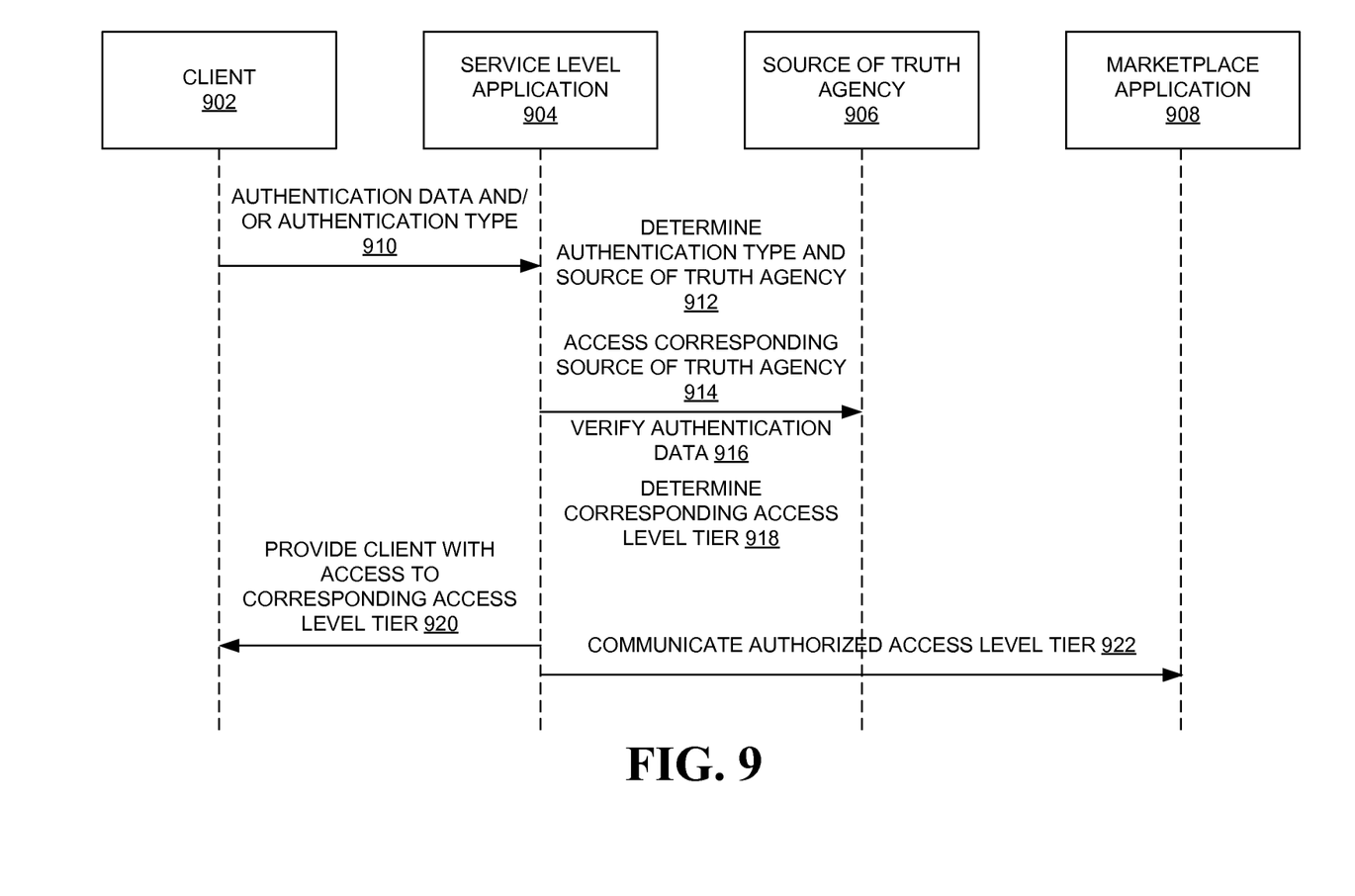
FIG. 9 shows a ladder diagram illustrating one example embodiment of an operation of the service level application.

FIG. 9 shows a ladder diagram illustrating one example embodiment of an operation of the service level application. At operation 910, a client 902 provides authentication data or an authentication type of the authentication data to a service level application 904. At operation 912, the service level application 904 determines an authentication type and a corresponding source of truth agency. At operation 914, the service level application 904 accesses the corresponding source of truth agency 906. At operation 916, the service level application 904 verifies the authentication data with the source of truth agency 906. At operation 918, the service level application 904 determines a corresponding access level tier, and provides the client 902 access to a marketplace application 908 with the corresponding access level tier in operation 920. At operation 922, the service level application 904 may communicate the authorized access level tier to the marketplace application 908.

Figure 10:
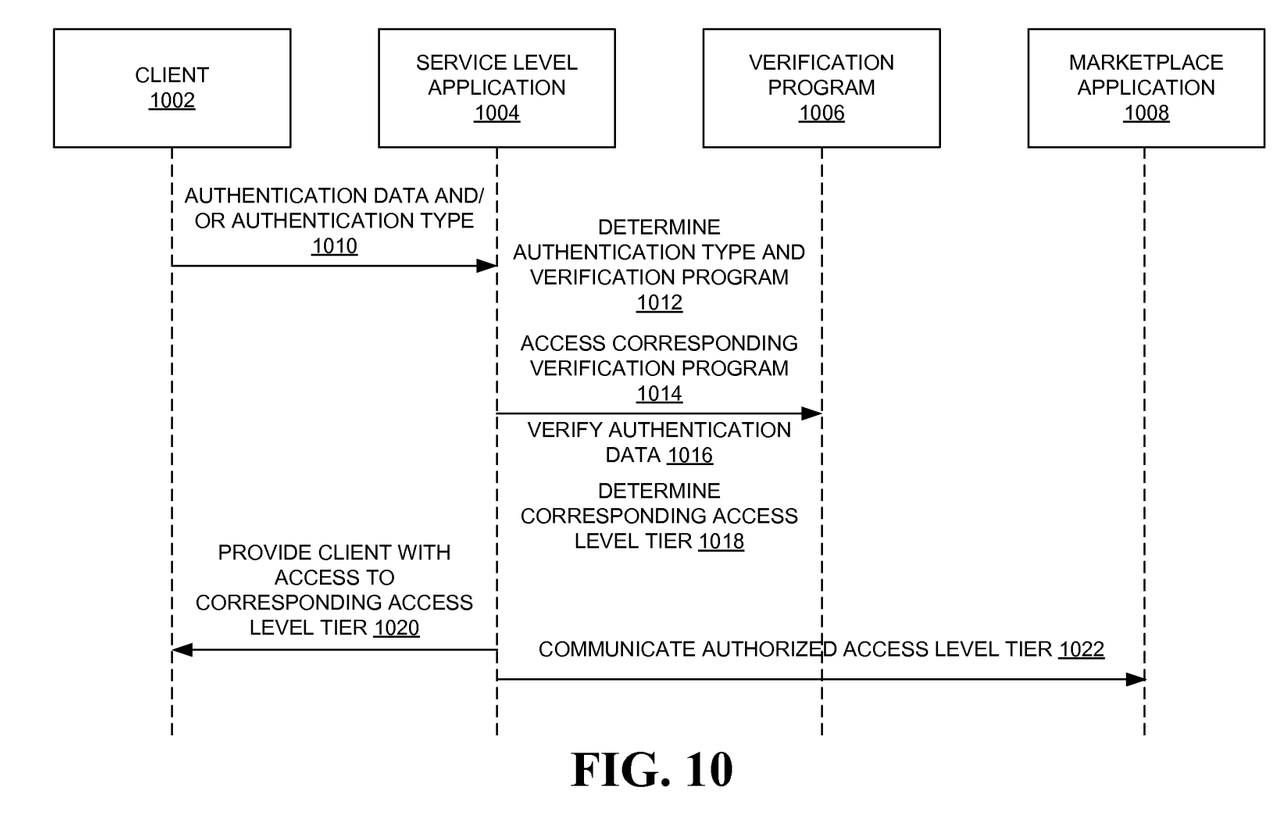
FIG. 10 shows a ladder diagram illustrating another example embodiment of an operation of the service level application.

FIG. 10 shows a ladder diagram illustrating another example embodiment of an operation of the service level application. At operation 1010, a client 1002 provides authentication data or an authentication type of the authentication data to a service level application 1004. At operation 1012, the service level application 1004 determines the authentication type and a corresponding verification program. At operation 1014, the service level application 1004 accesses the corresponding verification program 1006. At operation 1016, the service level application 1004 verifies the authentication data with the verification program 1006. At operation 1018, the service level application 1004 determines the corresponding access level tier based on the verification program 1006. At operation 1020, the service level application 1004 provides the client 1002 with access to a marketplace application 1008 with the corresponding access level tier. At operation 1022, the service level application 1004 communicates the authorized access level tier to the marketplace application 1008.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 11:
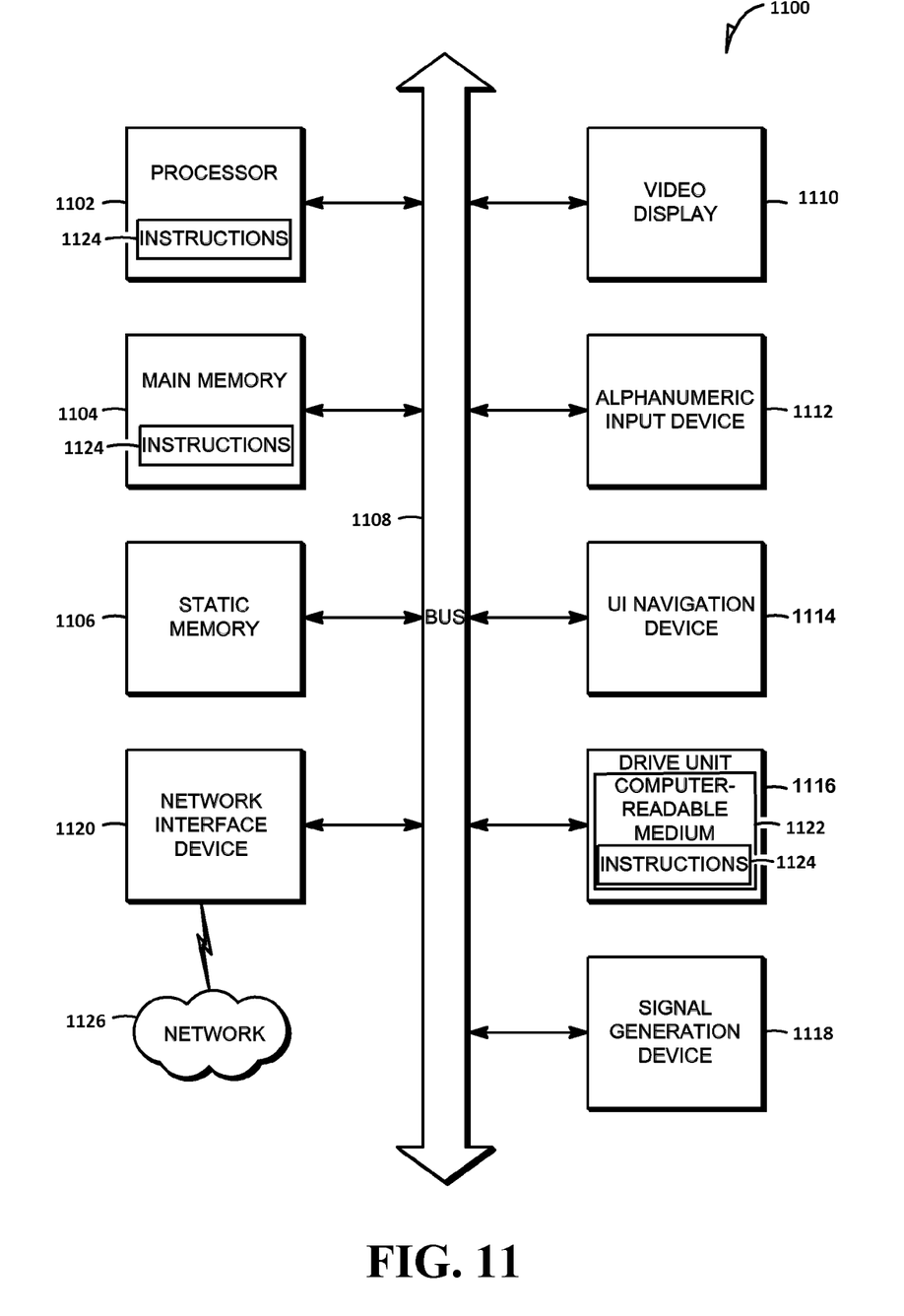
FIG. 11 shows a diagrammatic representation of machine, in the example form of a computer system, within which a set of instructions may be executed to cause the machine to perform any one or more of the methodologies discussed herein.

FIG. 11 shows a diagrammatic representation of a machine in the example form of a machine or computer system 1100 within which a set of instructions 1124 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine 110 or 112 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1124 (sequential or otherwise) that specify actions to be taken by that machine. Further, while only a single machine is illustrated, the term "machine" shall also be taken to include any collection of machines that individually or jointly execute a set (or multiple sets) of instructions 1124 to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a UI navigation device 1114 (e.g., a mouse), a drive unit 1116, a signal generation device 1118 (e.g., a speaker), and a network interface device 1120.

The drive unit 1116 includes a computer-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 or within the processor 1102 during execution thereof by the computer system 1100, with the main memory 1104 and the processor 1102 also constituting machine-readable media.

The instructions 1124 may further be transmitted or received over a network 1126 via the network interface device 1120 utilizing any one of a number of well-known transfer protocols (e.g., HTTP).

While the computer-readable medium 1122 is shown in an example embodiment to be a single medium, the term "computer-readable medium" should be taken to include a single medium or multiple media (e.g., a centralized or distributed database, and/or associated caches and servers) that store the one or more sets of instructions 1124. The term "computer-readable medium" shall also be taken to include any medium that is capable of storing, encoding, or carrying a set of instructions 1124 for execution by the machine that cause the machine to perform any one or more of the methodologies of the present disclosure, or that is capable of storing, encoding, or carrying data structures utilized by or associated with such a set of instructions 1124. The term "computer-readable medium" shall, accordingly, be taken to include, but not be limited to, solid-state memories, optical media, and magnetic media.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 12:
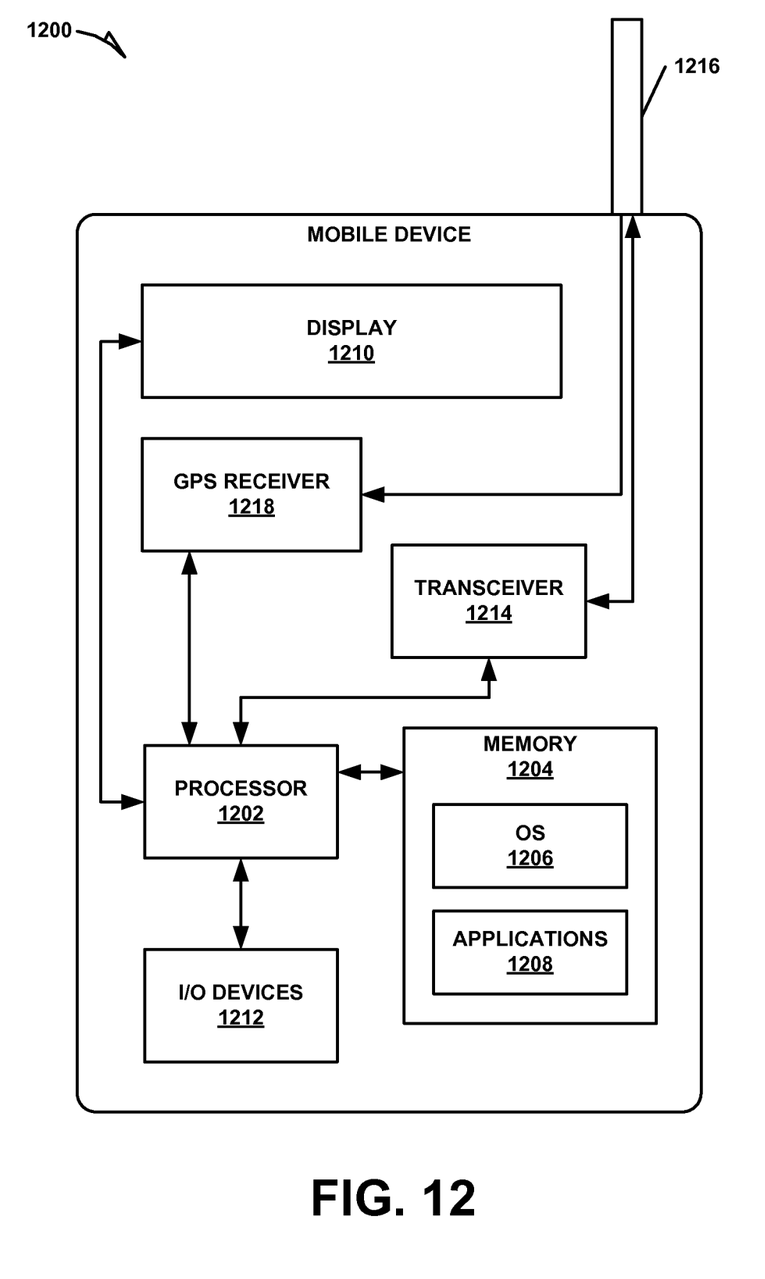
FIG. 12 is a block diagram illustrating a mobile device, according to an example embodiment.

FIG. 12 is a block diagram illustrating a mobile device 1200, according to an example embodiment. The mobile device 1200 may include a processor 1202. The processor 1202 may be any of a variety of different types of commercially available processors 1202 suitable for mobile devices 1200 (for example, an XScale architecture microprocessor, a microprocessor without interlocked pipeline stages (MIPS) architecture processor, or another type of processor 1202). A memory 1204, such as a random access memory (RAM), a flash memory, or another type of memory, is typically accessible to the processor 1202. The memory 1204 may be adapted to store an operating system (OS) 1206, as well as applications 1208, such as a mobile location enabled application that may provide location-based services (LBSs) to a user. The processor 1202 may be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 may be coupled to a transceiver 1214 that interfaces with an antenna 1216. The transceiver 1214 may be configured to both transmit and receive cellular network signals, wireless data signals, or other types of signals via the antenna 1216, depending on the nature of the mobile device 1200. Further, in some configurations, a GPS receiver 1218 may also make use of the antenna 1216 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   one or more computer processors; and
   a computer-readable medium storing instructions that, when executed by the one or more computer processors, cause the system to perform operations comprising:
   receiving, within a first time period, a request from a client to establish an account with a publication system, the request including authentication request data for requesting authentication of the client, the authentication request data including a first portion and a second portion;
   determining a first type of the first portion of the authentication request data and a second type of the second portion of the authentication request data;
   identifying a first authentication source for authenticating the client based on the first type of the first portion of the authentication request data and a second authentication source for authenticating the client based on the second type of the second portion of the authentication request data;
   transmitting, within a second time period after the first time period, a first authentication request including the first portion of the authentication request data to the first authentication source and a second authentication request including the second portion of the authentication request data to the second authentication source;
receiving, within a third time period after the second time period, first authentication response data from the first authentication source providing the client a first set of privileges within the publication system;
receiving, within a fourth time period after the third time period, second authentication response data from the second authentication source providing the client a second set of privileges within the publication system, the second set of privileges including one or more privileges excluded from the first set of privileges;
granting, between the second time period and the third time period, the client access to first resources of the publication system that correspond to the first set of privileges;
denying, between the third time period and the fourth time period, the client access to second resources of the publication system that correspond to the one or more privileges; and
granting, after the fourth time period, the client access to third resources of the publication system that correspond to the one or more privileges;
wherein the operations further comprise:
transmitting an authentication challenge to the client;
receiving a response to the authentication challenge from the client;
identifying a verification program associated with the authentication challenge; and
applying the verification program to the response to validate the response to the authentication challenge from the client; and
determining at least one of the first set of privileges or the second set of privileges based on the verification program.

2. The system of claim 1, wherein the operations further comprise identifying the first type of the first portion of the authentication request data based on a first format of the first portion of the authentication request data.

3. The system of claim 1, wherein the operations further comprise:
storing the first authentication response data and the second authentication response data in an access level tier matrix for the client; and
determining at least one of the first set of privileges or the second set of privileges from the access level tier matrix for the client.

4. The system of claim 1, wherein the operations further comprise verifying an identity associated with the client based on at least one of the first authentication response data or the second authentication response data.

5. The system of claim 1, wherein the operations further comprise limiting the client to a specified number of transaction activities within the publication system based on the first set of privileges excluding the one or more privileges.

6. The system of claim 1, wherein the operations further comprise limiting the client to one or more transactions within the publication system that add up to a specified monetary amount based on the first set of privileges excluding the one or more privileges.

7. A method comprising:
receiving, within a first time period, a request from a client to establish an account with a publication system, the request including authentication request data for requesting authentication of the client, the authentication request data including a first portion and a second portion;
determining, using one or more processors of the publication system, a first type of the first portion of the authentication request data and a second type of the second portion of the authentication request data;
identifying a first authentication source for authenticating the client based on the first type of the first portion of the authentication request data and a second authentication source for authenticating the client based on the second type of the second portion of the authentication request data;
transmitting, within a second time period after the first time period, a first authentication request including the first portion of the authentication request data to the first authentication source and a second authentication request including the second portion of the authentication request data to the second authentication source;
receiving, within a third time period after the second time period, first authentication response data from the first authentication source providing the client a first set of privileges within the publication system;
receiving, within a fourth time period after the third time period, second authentication response data from the second authentication source providing the client a second set of privileges within the publication system, the second set of privileges including one or more privileges excluded from the first set of privileges;
granting, between the second time period and the third time period, the client access to first resources of the publication system that correspond to the first set of privileges;
denying, between the third time period and the fourth time period, the client access to second resources of the publication system that correspond to the one or more privileges; and
granting, after the fourth time period, the client access to third resources of the publication system that correspond to the one or more privileges;
transmitting an authentication challenge to the client;
receiving a response to the authentication challenge from the client;
identifying a verification program associated with the authentication challenge; and
applying the verification program to the response to validate the response to the authentication challenge from the client; and
determining at least one of the first set of privileges or the second set of privileges based on the verification program.

8. The method of claim 7, further comprising identifying the first type the first portion of the authentication request data based on a first format of the first portion of the authentication request data.

9. The method of claim 7, further comprising:
storing the first authentication response data and the second authentication response data in an access level tier matrix for the client; and
determining at least one of the first set of privileges or the second set of privileges from the access level matrix for the client.

10. The method of claim 7, further comprising verifying an identity associated with the client based on at least one of the first authentication response data or the second authentication response data.

11. The method of claim 7, further comprising limiting the client to a specified number of transaction activities within the publication system based on the first set of privileges excluding the one or more privileges.

12. A non-transitory computer-readable storage medium storing a set of instructions that, when executed by one or more processors of a machine, cause the machine to perform operations comprising:
- receiving, within a first time period, a request from a client to establish an account with a publication system, the request including authentication request data for requesting authentication of the client, the authentication request data including a first portion and a second portion;
- determining a first type of the first portion of the authentication request data and a second type of the second portion of the authentication request data;
- identifying a first authentication source for authenticating the client based on the first type of the first portion of the authentication request data and a second authentication source for authenticating the client based on the second type of the second portion of the authentication request data;
- transmitting, within a second time period after the first time period, a first authentication request including the first portion of the authentication request data to the first authentication source and a second authentication request including the second portion of the authentication request data to the second authentication source;
- receiving, within a third time period after the second time period, first authentication response data from the first authentication source providing the client a first set of privileges within the publication system;
- receiving, within a fourth time period after the third time period, second authentication response data from the second authentication source providing the client a second set of privileges within the publication system, the second set of privileges including one or more privileges excluded from the first set of privileges;
- granting, between the second time period and the third time period, the client access to first resources of the publication system that correspond to the first set of privileges;
- denying, between the third time period and the fourth time period, the client access to second resources of the publication system that correspond to the one or more privileges; and
- granting, after the fourth time period, the client access to third resources of the publication system that correspond to the one or more privileges;

wherein the operations further comprise:
- transmitting an authentication challenge to the client;
- receiving a response to the authentication challenge from the client;
- identifying a verification program associated with the authentication challenge; and
- applying the verification program to the response to validate the response to the authentication challenge from the client; and
- determining at least one of the first set of privileges or the second set of privileges based on the verification program.

13. The non-transitory computer-readable storage medium of claim 12, wherein the operations further comprise:
- identifying the first type of the first portion of the authentication data based on a first format of the first portion of the authentication request data.

14. The non-transitory computer-readable storage medium of claim 12, wherein the operations further comprise:
- storing the first authentication response data and the second authentication response data in an access level tier matrix for the client; and
- determining at least one of the first set of privileges or the second set of privileges from the access level tier matrix for the client.

15. The non-transitory computer-readable storage medium of claim 12, wherein the operations further comprise verifying an identity associated with the client based on at least one of the first authentication response data or the second authentication response data.

16. The non-transitory computer-readable storage medium of claim 12, wherein the operations further comprise limiting the client to a specified number of transaction activities within the publication system based on the first set of privileges excluding the one or more privileges.

17. The non-transitory computer-readable storage medium of claim 12, wherein the operations further comprise limiting the client to one or more transactions within the publication system that add up to a specified monetary amount based on the first set of privileges excluding the one or more privileges.

* * * * *

UNITED STATES PATENT AND TRADEMARK OFFICE
CERTIFICATE OF CORRECTION

PATENT NO. : 10,181,143 B2
APPLICATION NO. : 14/462361
DATED : January 15, 2019
INVENTOR(S) : Venkatesh Thanuvan et al.

It is certified that error appears in the above-identified patent and that said Letters Patent is hereby corrected as shown below:

In the Claims

In Column 16, Line 58, in Claim 9, delete "level" and insert -- level tier --, therefor.

Signed and Sealed this
Eighteenth Day of August, 2020

Andrei Iancu
*Director of the United States Patent and Trademark Office*